US008028721B2

(12) United States Patent
Koskey, Jr.

(10) Patent No.: US 8,028,721 B2
(45) Date of Patent: Oct. 4, 2011

(54) HEATED GARDEN HOSE FOR USE COLD WEATHER

(75) Inventor: James Donald Koskey, Jr., Manitou Springs, CO (US)

(73) Assignee: K & H Manufacturing, LLC, Colorado Springs, CO (US)

( * ) Notice: Subject to any disclaimer, the term of this patent is extended or adjusted under 35 U.S.C. 154(b) by 229 days.

(21) Appl. No.: 12/321,969

(22) Filed: Jan. 28, 2009

(65) Prior Publication Data

US 2010/0186844 A1      Jul. 29, 2010

Related U.S. Application Data

(60) Provisional application No. 61/124,048, filed on Apr. 14, 2008.

(51) Int. Cl.
*F16L 53/00*          (2006.01)

(52) U.S. Cl. ............ 138/33; 138/32; 392/489; 392/480; 219/523; 219/528

(58) Field of Classification Search .......... 138/27, 138/32, 33; 219/523, 528, 549; 392/489, 392/480
See application file for complete search history.

(56) References Cited

U.S. PATENT DOCUMENTS

| 1,474,528 | A | * | 11/1923 | Hurst | 219/208 |
|---|---|---|---|---|---|
| 3,378,673 | A | * | 4/1968 | Hopper | 392/472 |
| 3,519,023 | A | * | 7/1970 | Burns, Sr. et al. | 138/33 |
| 3,754,118 | A | * | 8/1973 | Booker | 219/523 |
| 4,214,147 | A | * | 7/1980 | Kraver | 392/468 |
| 4,423,311 | A | * | 12/1983 | Varney, Sr. | 392/468 |
| 5,859,953 | A | * | 1/1999 | Nickless | 392/489 |
| 5,933,574 | A | * | 8/1999 | Avansino | 392/468 |
| 5,975,119 | A | * | 11/1999 | Silva et al. | 137/341 |
| 6,727,481 | B1 | * | 4/2004 | Wilds | 219/549 |
| 7,721,766 | B2 | * | 5/2010 | Sawada | 138/32 |
| 2007/0036528 | A1 | * | 2/2007 | Ferrone | 392/480 |
| 2008/0271801 | A1 | * | 11/2008 | Sonderegger et al. | 138/33 |
| 2009/0266435 | A1 | * | 10/2009 | Ferrone | 138/33 |

* cited by examiner

*Primary Examiner* — Patrick F Brinson

(57) ABSTRACT

The present invention is related to a heated garden hose that has a flexible hose with an inlet and an outlet. The garden hose has an inlet coupler and an outlet coupler. A heating cable coupler is connected between the inlet and the outlet of the flexible hose. A heating cable has a first end with an electrical plug and extends through the heating cable coupler into the interior of the flexible hose. The heating cable is free floating inside the flexible hose. A thermostat, attached to the exterior portion of the heating cable, controls the heating cable and is designed to turn the heating cable off just above the freezing temperature of water. A clip is inserted into the flexible hose near the outlet to hold the heating cable inside of the flexible hose.

13 Claims, 2 Drawing Sheets

HEATED GARDEN HOSE FOR USE COLD WEATHER

RELATED APPLICATIONS

The present invention claims priority on provisional patent application, Ser. No. 61/124,048, filed on Apr. 14, 2008, entitled "Heated Garden Hose" and is hereby incorporated by reference.

STATEMENT REGARDING FEDERALLY SPONSORED RESEARCH

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

In the winter garden hoses become clogged with ice and may break or break the faucet if left connected to a faucet. However, many people need to use a garden hose during the winter to fill up hot tubs, ornamental ponds, stock tanks and a variety of other uses. There have been attempts to provide a heated garden hose. For instance, there have been garden hoses with heating wires running inside the housing of the hose. This requires setting up a different production system and specialized machinery for garden hoses. Alternatively, there have been heated hoses with the heating element running on the outside of the rubberized hose with an insulating sleeve covering the hose and heating element the entire length of the hose. This also requires specialized machinery to produce. Because the prior designs require specialized machinery to produce they are difficult to manufacture and this cause the price of these heated hose to be well over one hundred dollars and therefore out of the reach of the average consumer.

Thus, there exists a need for garden hose that can be used in the winter without clogging up with ice or breaking and is inexpensive and relatively simple to manufacture.

BRIEF SUMMARY OF INVENTION

A heated garden hose that overcomes these and other problems has a flexible hose with an inlet and an outlet. The garden hose has an inlet coupler and an outlet coupler. A heating cable coupler is connected between the inlet and the outlet of the flexible hose. A heating cable has a first end with an electrical plug and extends through the heating cable coupler into the interior of the flexible hose. The heating cable is free floating inside the flexible hose. A thermostat, attached to the exterior portion of the heating cable, controls the heating cable and is designed to turn the heating cable off just above the freezing temperature of water. A clip is inserted into the flexible hose near the outlet to hold the heating cable inside of the flexible hose. The heating cable coupler may be a Y coupler with a branch through which the heating cable extends. The branch of the Y coupler with the heating cable is filled with epoxy and has a cap on the end of the branch. The heating cable may have an enlarged portion which is designed to engage the branch of the Y coupler.

DETAILED DESCRIPTION OF THE INVENTION

The present invention is related to a heated garden hose that has a flexible hose with an inlet and an outlet. The garden hose has an inlet coupler and an outlet coupler. A heating cable coupler is connected between the inlet and the outlet of the flexible hose. A heating cable has a first end with an electrical plug and extends through the heating cable coupler into the interior of the flexible hose. The heating cable is free floating inside the flexible hose. A thermostat, attached to the exterior portion of the heating cable, controls the heating cable and is designed to turn the heating cable off just above the freezing temperature of water. A clip is inserted into the flexible hose near the outlet to hold the heating cable inside of the flexible hose. The heating cable coupler may be a Y coupler with a branch through which the heating cable extends. The branch of the Y coupler with the heating cable is filled with epoxy and has a cap on the end of the branch. The heating cable may have an enlarged portion which is designed to engage the branch of the Y coupler.

Figure 1:
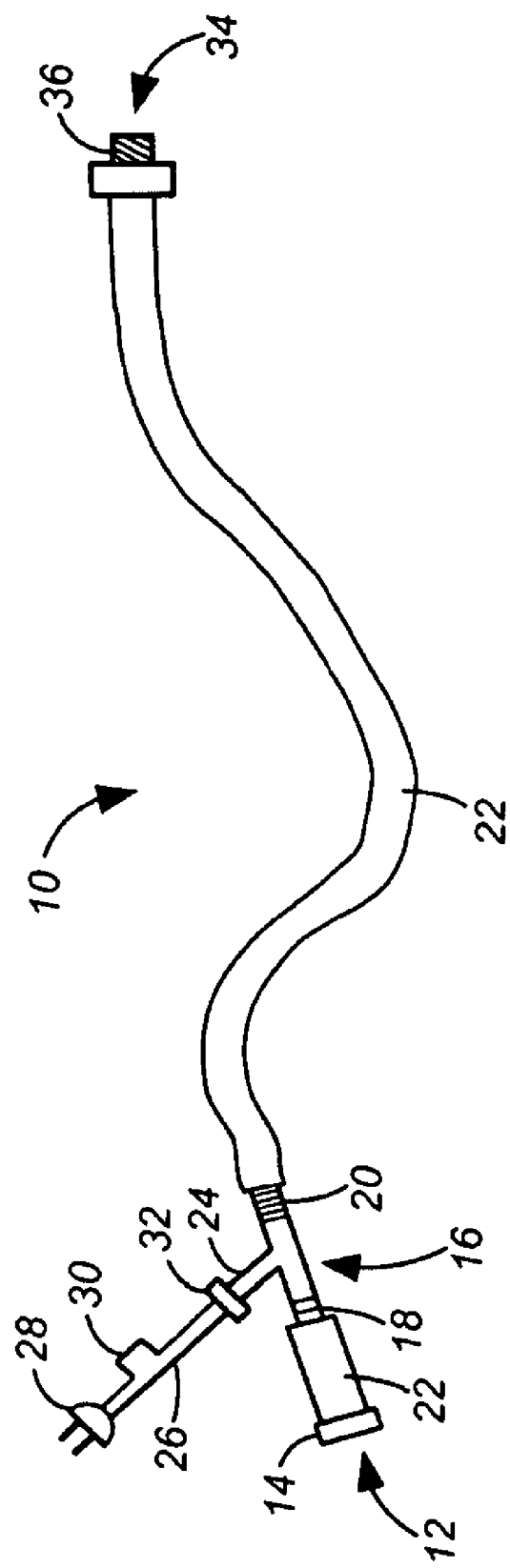
FIG. 1 is a top view of a heated garden hose in accordance with one embodiment of the invention.

FIG. 1 is a top view of a heated garden hose 10 in accordance with one embodiment of the invention. The heated garden hose 10 has an inlet 12 for allowing water into the interior of the garden hose 10. The inlet 12 has an inlet coupler 14 for connecting to a faucet or other source of water. A electrical cable ingress/egress point is form by a Y coupler 16. The ends 18, 20 of the straight portion of the Y coupler 16 are connect to the garden hose 22. Note the garden hose 22 is a standard off the shelf garden hose. The branch 24 of the Y coupler 16 is the inlet/outlet for the electrical heating cable 26. The electrical heating cable 26 has a standard electrical plug 28 at one end. A thermostat 30 is built into the electrical heating cable 26 and controls the power to the heating cable 26. A cap 32 fits over the branch 24 of the Y coupler 16. The heating portion of the electrical heating cable 26 is fed through the interior of the garden hose 22 and is free floating inside the garden hose 22. The outlet 34 of the hose 22 has an outlet coupler 36.

Figure 2:
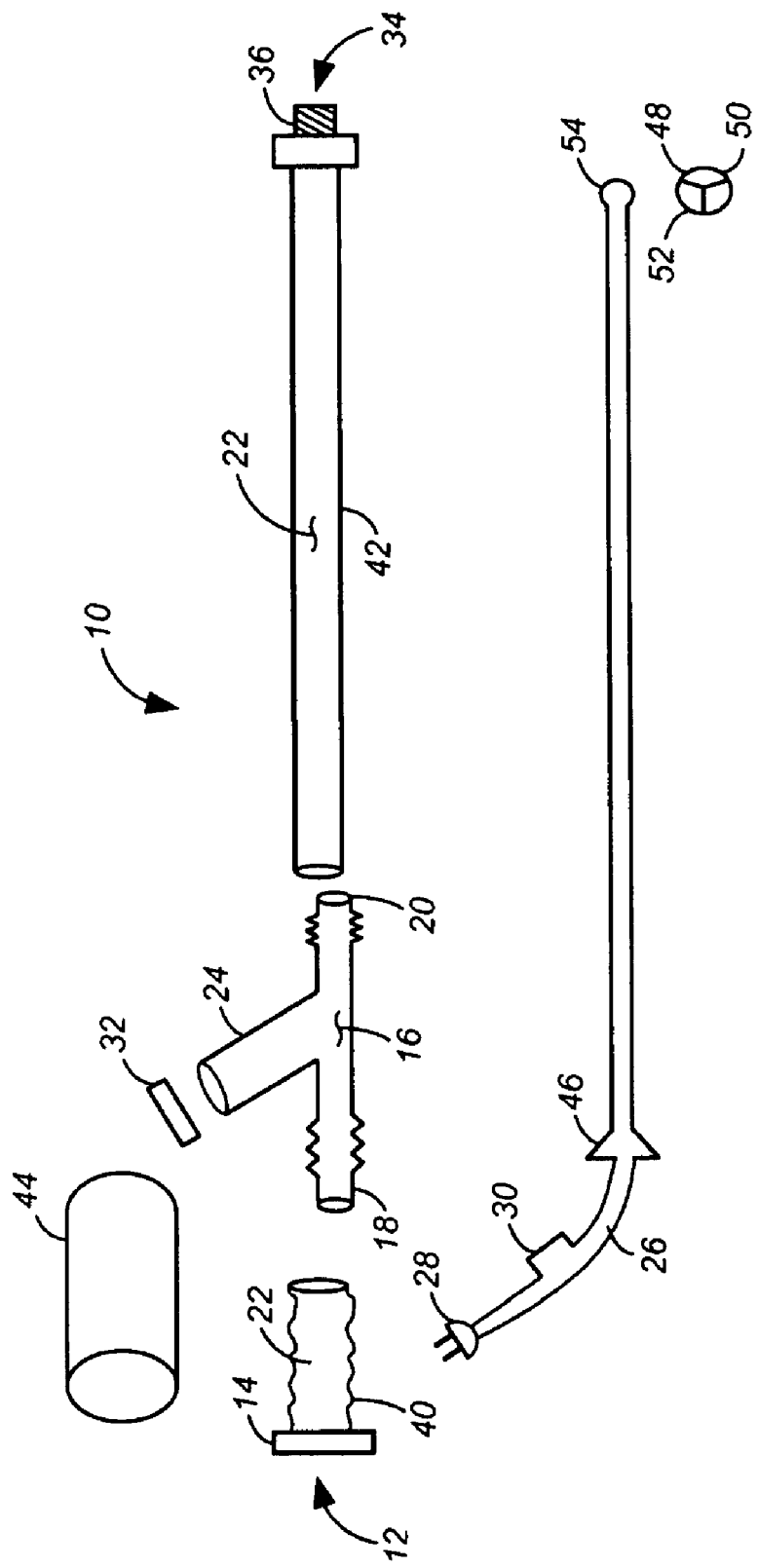
FIG. 2 is an exploded view of a heated garden hose in accordance with one embodiment of the invention.

FIG. 2 is an exploded view of a heated garden hose 10 in accordance with one embodiment of the invention. The exploded view of the heated garden hose 10 shows the hose has a first part 40 and a second part 42 connected by the Y coupler 16. A heat shrink tube 44 may be placed over the first part 40 of the garden hose 22. The heat shrink tube 44 may have an adhesive on an interior portion of the tube 22 and will shrink to fit over the garden hose 22 when heat is applied. The heat shrink tube 22 prevents the first part 40 of the garden hose 22 from kinking when the hose is pulled sideways while hooked up to a faucet spout. The exploded view shows that the electrical heating cable 26 has a plug 46, which matingly fits into the branch 24 of the Y coupler and helps to seal the branch from water. Epoxy is used to completely seal the branch 24 from water. A retaining clip 48 is a plastic ring 50 with semispherical legs 52 and fits into the outlet 34 of the garden hose 22. The ring 50 seats against an edge of the outlet coupler 36 and the legs 52 prevent the end 54 of the heating cable 26 from exiting the outlet 34 of the hose 22. Note that the length of the electrical heating cable 26 will change with temperature.

In operation, the hose 10 is connected to a faucet and the electrical plug is connected to an electrical outlet. When the temperature falls to just above the freezing point of water, the thermostat 30 turns on the heating cable 26. In one embodiment, this temperature is set to thirty five degrees Fahrenheit. When the temperature rises above this temperature, the heating cable 26 is turned off. In one embodiment, the heating cable 26 is setup to use five watts of energy per foot of the heating cable inside the hose, approximately from the plug 46 to the end 54 of the heating cable 26. The user can be assured that their heated garden hoses will be ready to use all winter long. The heated hose 10 is inexpensive to manufacture, since it uses a standard garden hose. The thermostat makes sure that the heated hose is not wasting energy when the temperature is above freezing.

Thus there has been describe a heated garden hose that can be used in the winter without clogging up with ice or breaking and is inexpensive and relatively simple to manufacture. Alternatively, the hose can be left unplugged until it is need. By plugging the hose in and waiting about 20 minutes the ice will be thawed and the hose will be ready to use.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A heated garden hose for use in cold weather comprising:
    a flexible hose having an inlet and an outlet, the inlet having an input coupler and the outlet having an outlet coupler;
    a heating cord coupler located between the inlet and the outlet of the flexible hose, the heating cord coupler providing access to an interior of the flexible hose;
    a heating cable having a first end with an electrical plug, the heating cable extending through the heating cord coupler and through an interior of the flexible hose, wherein the portion of the heating cable enclosed in the flexible hose is not attached to the interior of the flexible hose; and
    a retaining clip inserted into the interior of the flexible hose at the outlet.

2. The heated garden hose of claim 1, wherein the heating cord coupler is a Y coupler.

3. The heated garden hose of claim 2, wherein a branch of the Y coupler is sealed with a potting compound.

4. The heated garden hose of claim 1, further including a thermostat attached to the heating cable.

5. The heated garden hose of claim 1, further including a shrink tube between the inlet of the flexible hose and the heating cord coupler.

6. The heated garden hose of claim 4, wherein the thermostat is set to turn on the heating cable at a temperature near the freezing point of water.

7. A heated garden hose for use in cold weather comprising:
    a flexible hose having an inlet and an outlet;
    a heating cable egress/ingress formed in a heating cord coupler located between the inlet and the outlet of the flexible hose;
    a heating cable having a first end with an electrical plug, the heating cable extending through the heating cord coupler and through an interior of the flexible hose, wherein the portion of the heating cable enclosed in the flexible hose is not attached to the interior of the flexible hose; and
    a retaining clip inserted into the interior of the flexible hose at the outlet.

8. The heated garden hose of claim 7, further including a thermostat connected to an exposed part of the heating cable.

9. The heated garden hose of claim 8, wherein the thermostat is set to turn on the heating cable at a temperature near the freezing point of water.

10. The heated garden hose of claim 9, wherein the heating cable uses five watts per foot of the heating cable in the interior of the flexible hose.

11. The heated garden hose of claim 10, wherein the heating cord egress/ingress is a Y coupler.

12. The heated garden hose of claim 11, wherein a branch of the Y coupler is sealed with a potting compound.

13. The heated garden hose of claim 12, further including a shrink tube between the inlet of the flexible hose and the Y coupler.

* * * * *